(12) United States Patent
Lin et al.

(10) Patent No.: US 11,094,463 B2
(45) Date of Patent: Aug. 17, 2021

(54) METHOD FOR MANUFACTURING SPHERICAL CERAMIC-GLASS NANOCOMPOSITE DIELECTRICS FOR MULTILAYER CERAMIC CAPACITOR APPLICATIONS

(71) Applicant: Aegis Technology Inc., Santa Ana, CA (US)

(72) Inventors: Zhigang Lin, Santa Ana, CA (US); Chunhu Tan, Santa Ana, CA (US)

(73) Assignee: Aegis Technology Inc., Santa Ana, CA (US)

( * ) Notice: Subject to any disclaimer, the term of this patent is extended or adjusted under 35 U.S.C. 154(b) by 127 days.

(21) Appl. No.: 16/287,921

(22) Filed: Feb. 27, 2019

(65) Prior Publication Data

US 2020/0273620 A1   Aug. 27, 2020

(51) Int. Cl.
*H01G 4/12* (2006.01)
*H01G 4/30* (2006.01)
(Continued)

(52) U.S. Cl.
CPC .............. *H01G 4/1218* (2013.01); *B01J 2/16* (2013.01); *C04B 35/117* (2013.01);
(Continued)

(58) Field of Classification Search
CPC ............ H01G 4/12; H01G 4/012; H01G 4/30; H01G 4/1218; C04B 36/117; C04B 35/58058; C04B 35/62231; B01J 2/16
(Continued)

(56) References Cited

U.S. PATENT DOCUMENTS 6,563,690 B2   5/2003   Kishi et al.
6,743,518 B2   6/2004   Ogasawara et al.
(Continued)

FOREIGN PATENT DOCUMENTS

EP    1017069 A2 *   7/2000   ........... C04B 35/462
JP    2012031040 A *  2/2012   ............. H01G 4/129

OTHER PUBLICATIONS

Michael H. Rubinstein, Peta Gould; "Particle Size Reduction in the Ball Mill", Oct. 2, 2008, Abstract (Year: 2008).*
(Continued)

*Primary Examiner* — Arun Ramaswamy
(74) *Attorney, Agent, or Firm* — Charles H Jew

(57) ABSTRACT

Spherical ceramic-glass nanocomposite dielectrics made from ceramics and glasses that are separately pre-milled by mechanical ball milling using selected ball-to-powder weight ratios and combined to form a mixture that is ball milled. A stable liquid suspension of the milled mixture including an added dispersant such as polyacrylic acid to improve uniformity is spray dried through a nozzle and recovered product is annealed. The novel dielectrics have a microstructure where ceramic primary particles are uniformly distributed and fully embedded in a glass matrix. The dielectrics have a mean particle size of about 1-20 um and a sphericity of about 0.8 or higher which are suitable for fabricating multilayer ceramic capacitors for high temperature applications. The novel dielectrics afford decreased sintering temperature, enhanced breakdown strength, lower dielectric lose tangent, and lower costs. Calcium titanate zirconate with manganese-doping-based or barium titanate-based dielectric ceramics and alkali-free borosilicate glass produce superior nanocomposite dielectrics.

24 Claims, 10 Drawing Sheets

(51) Int. Cl.
*C04B 35/117* (2006.01)
*C04B 35/58* (2006.01)
*C04B 35/622* (2006.01)
*B01J 2/16* (2006.01)

(52) U.S. Cl.
CPC .. *C04B 35/58085* (2013.01); *C04B 35/62231* (2013.01); *H01G 4/30* (2013.01); *C04B 2235/3232* (2013.01)

(58) Field of Classification Search
USPC ........ 361/301.4, 321.1, 321.4, 311; 29/25.42
See application file for complete search history.

(56) References Cited

U.S. PATENT DOCUMENTS

| | | |
|---|---|---|
| 7,332,321 B2 | 2/2008 | Belcher et al. |
| 2003/0124050 A1* | 7/2003 | Yadav ................ H01M 8/1246 423/592.1 |
| 2009/0103238 A1* | 4/2009 | Ryu ..................... C01G 23/006 361/321.4 |
| 2018/0286590 A1* | 10/2018 | Rolin ..................... H01G 4/224 |

OTHER PUBLICATIONS

Todd C. Monson et al, Barium Titanate Nanocomposite Capacitor, FY09 Year End Report, Sandia Report SAND 2009-7301, Nov. 2009.

* cited by examiner

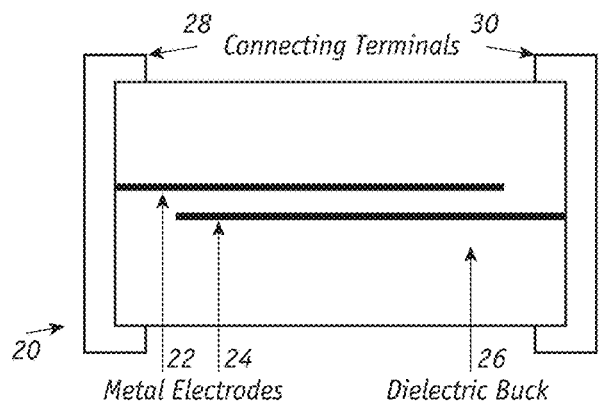
FIG. 18B
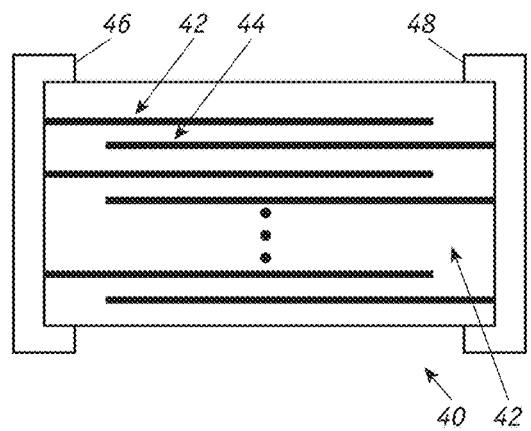
FIG. 18C
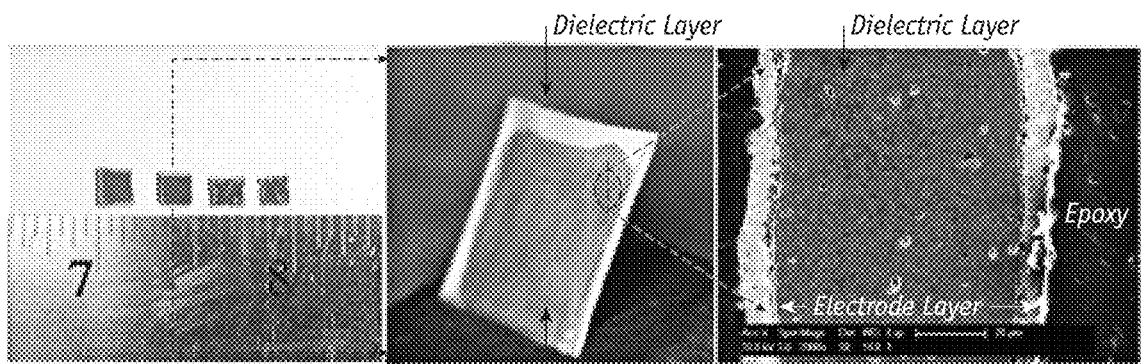
FIG. 19A     FIG. 19B     FIG. 19C
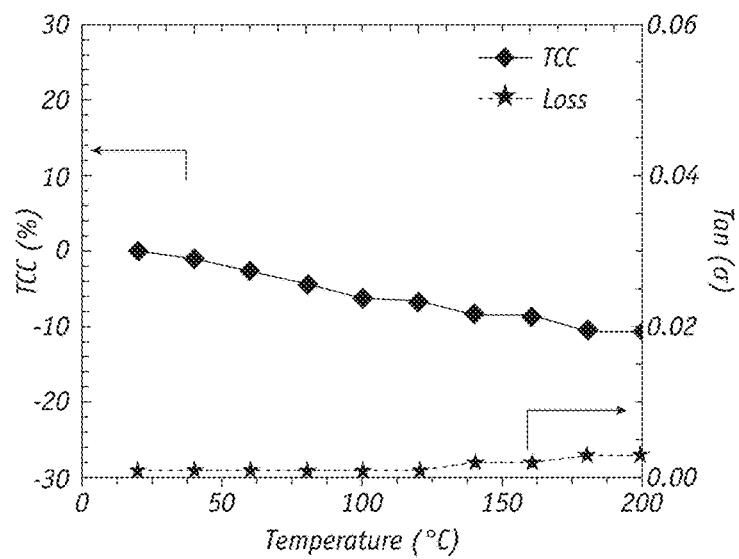
FIG. 20

METHOD FOR MANUFACTURING SPHERICAL CERAMIC-GLASS NANOCOMPOSITE DIELECTRICS FOR MULTILAYER CERAMIC CAPACITOR APPLICATIONS

The invention was made with Government support under SBIR Grant No. W15QKN-17-C0012 awarded by the U.S. Army to Aegis Technology Inc. The Government has certain rights to the invention.

FIELD OF THE INVENTION

The present invention generally relates to methods for manufacturing spherical ceramic-glass nanocomposite dielectric powders which have a microstructure in which ceramic primary particles are uniformly distributed and fully embedded in a glass matrix. The dielectric powders are particularly suited for fabricating improved multilayer ceramic capacitors. Separately pre-milled ceramics and glasses are employed to form a slurry that is spayed dried to yield the spherical ceramic-glass nanocomposite dielectric powders that are subsequently annealed.

BACKGROUND OF THE INVENTION

Improvements in power conditioning and pulse power systems depend on the availability of better passive electrical components, particularly power capacitors. These capacitors must demonstrate long endurance times, high energy storage capability, high thermal stability, and rapid discharge capabilities. Currently-fielded capacitors suffer from low energy density, making them bulky and expensive. For example, a capacitor takes up to 20-25% of both the inverter weight and inverter cost and up to 35-40% of the inverter volume. Capacitors must also exhibit sufficient capacitance, energy density, breakdown strength, and other properties at elevated temperatures (>150° C.).

State-of-the-art dielectric materials used in capacitors only offer an energy density of ~1.2 J/cc and have seen only marginal performance gains in the past decade. Recently, ceramic-polymer-based nanocomposites that combine high breakdown strength polymers with high dielectric constant fillers in the form of ceramic nanoparticles have been used in power capacitors with the expectation of enhanced performance. Unfortunately, these capacitors are hindered by several significant challenges of limited energy densities due to low loading of the fillers and degraded performance at high temperatures due mainly to the intrinsic limitation of the polymers.

Pure ceramic capacitors, in particular multilayer ceramic capacitors (MLCCs), have intrinsic high temperature capabilities but current MLCCs are not suitable for large-scale applications such as pulsed power weapons due to difficulties in firing large ceramic components with low porosity (high density), few defects, and high mechanical reliability. The industry is in need of high temperature and high energy density power capacitors that can be produced in a cost-effective and scalable manner.

SUMMARY OF THE INVENTION

The present invention is based in part on demonstrating that, in fabricating spherical-ceramic-glass nanocomposite dielectrics, the uniformity of the microstructure of the nanocomposite dielectrics is a critical feature that influences the performance of the resultant MLCCs. In particular, the ceramic primary particles should be uniformly distributed and fully embedded in the glass matrix, otherwise the gaps between the ceramic primary particles will not be completely filled with glass thereby creating pores and voids in sintered dielectric products. The uniform microstructure also facilitates the sintering of dielectric products at low temperatures. In particular, deleterious side-reactions between ceramic and glass phases during sintering are minimized; the sintered dielectric products have fewer pores and voids and exhibit superior dielectric properties.

Accordingly, one aspect of the invention is directed to a method of preparing spherical ceramic-glass nanocomposite dielectric powders that includes: (a) pre-milling a ceramic substance to yield ceramic particles; (b) pre-milling a glass substance to yield glass nanoparticles; (c) forming a suspension slurry comprising of the ceramic particles and glass nanoparticles; (d) spray drying through a spray nozzle the suspension slurry to form liquid droplets and removing liquid from the droplets to yield spherical nanocomposite granular powder; and (e) annealing the spherical nanocomposite granular powder. The two pre-milling steps are performed separately. The spherical ceramic-glass nanocomposite dielectric powders are suitable for the fabrication of MLCCs which can be sintered at relatively lower temperature (~1050-1150° C.). These MLCCs exhibit high breakdown strength, high energy density, and high temperature stability. Preferred dielectric powders are made from a calcium titanate zirconate with manganese-doping-based (referred to herein as "CTZ+Mn-based") or barium titanate-based (referred to herein as "BTO-based") dielectric ceramic phase that is combined with a barium boroaluminosilicate glass phase.

A preferred CTZ+Mn-based dielectric ceramic phase is a Mn-doped $CaTiO_3$—$CaZrO_3$ Class I ceramic dielectrics in the form of $Ca(Ti_{1-x}Zr_xMn_y)O_3$ that have moderately high dielectric constants, very low dissipation factors (e.g. <0.2%) and excellent temperature reliability over a wide range of temperatures. These ceramic dielectrics are particularly suitable for high rating voltage (e.g., 600V-1500V or more) and high temperature (e.g., >200° C.) applications.

A preferred BTO-based dielectric ceramic phase is a Ta-doped $BaTiO_3$—$Bi_{0.5}Na_{0.5}TiO_3$ (BTO-BNTO-TO) Class II ceramic dielectrics in the form of $(1-x)BaTiO_{3-x}Bi_{0.5}Na_{0.5}TiO_{3-y}Ta_2O_5$, or referred to as BTO-based ceramic dielectrics that feature high dielectric constants and relatively low dissipation factors (e.g. <1-2%). These ceramic dielectrics are particularly suited for low rating voltages (e.g., 5V-150V) applications.

A preferred barium boroaluminosilicate glass phase is commercially available as AF45 glass (Schott AG) which is a type of barium boroaluminosilicate glass and which is alkali free in synthesis and has relatively high dielectric constant (~6 at 1 MHz), low dielectric lose tangent (~9× $10^{-4}$), and high breakdown strength (>1 MV/cm). Integration of the glass into nanocomposite dielectrics decreases their sintering temperature and enhances their breakdown strength. AF45 glass is also commercially available in powder form under the designation G018-281.

A preferred method of pre-milling synthesized CTZ+Mn or BTO ceramics occurs with the presence of secondary aggregates (formed during synthesis) of primary particles. This pre-milling step can be carried out using a ball milling method with a relatively low ball to powder weight ratio (e.g., typically from 1:1 to 10:1 and preferably from 2:1 to ~5:1) with or without milling media (e.g., water, ethanol, acetone, etc.) for a relatively short time (e.g., ~3-9 hours), so that the aggregates can be crushed into fully isolated primary particles but without further crushing into smaller pieces. These fully isolated primary particles of ceramics are ready to make the ceramic-glass nanocomposite dielectric powders. Typically, the synthesized ceramic substances have a mean secondary particle (or cluster) size of about 10 to 50 μm and preferably 15 to 30 μm. After pre-milling, the ceramics particles have a mean primary particle size of about 0.5 μm to 2 μm and preferably 0.8 μm to 1.2 μm.

A preferred method of pre-milling AF45 glass frits with relatively larger particles dimensions (e.g., ~10-50 μm) is ball milling with a relatively high ball to powder weight ratio (e.g., typically from 20:1 to 40:1 and preferably from 25:1 to ~35:1) with or without milling media (e.g., water, ethanol, acetone, etc.) for a relatively longer time (e.g., ~9-16 hours), so that the glass frits are crushed and milled into smaller nanosized particles (e.g., ~50-200 nm). These glass nanoparticles are used to make the ceramic-glass nanocomposite dielectric powders. Typically, the glass substances have a mean particle size of about 10 to 50 jam and preferably 15 to 30 am. After pre-milling, the glass nanoparticles have a mean particle size of about 20 to 500 nm and preferably 50 to 200 nm. If glass powder (G018-281) is used, the pre-milling conditions are adjusted to produced the desired nanosized particles (e.g., ~50-200 nm).

A preferred method of forming the suspension slurry is to mix the ceramic particles and glass nanoparticles in liquid and ball milling the liquid mixture with a relatively low ball to powder weight ratio (e.g., typically ~1:1 to 10:1 and preferably from 2:1 to ~5:1) for about 1-10 hours, and thereafter adding a surfactant or dispersant. Spray drying the suspension slurry produces dried spherical ceramic-glass nanocomposite powders that are then annealed. The powders typically have a mean particle size of about 1-20 μm and preferably about 2 to 10 μm, a sphericity of about 0.4 to 0.9 and preferably 0.8 or higher. The ceramic-glass nanocomposite materials permit decreased sintering temperature, enhanced breakdown strength, and lower dielectric loss tangent.

In a preferred method, after milling the liquid mixture to form a milled slurry, additional water is added to dilute the aqueous milled slurry to a weight ratio of water to powder ~2:1-20:1. Polyacrylic acid (PAA) is added to comprise ~0.1-2 wt. % of the total slurry which was stirred ~0.5-2 hours to achieve a uniform mixture. The pH of the obtained slurry is adjusted to ~9-10 with ammonia in order to generate a stable suspension before being sprayed dried. In addition, the slurry suspension can be treated with ultrasound for ~0.5-2 hours to improve homogeneity before being sprayed dried.

In particularly preferred method, ultrasonic treated suspension slurry is spray dried through a spray nozzle at a temperature of ~120-300° C. with a speed of ~100-800 ml/h to generate spherical ceramic-glass nanocomposite dielectric powders. The powders are collected and annealed in open air at ~400-700° C. for ~0.5-4 hours to remove (burn out) PAA residues and any accumulated strains in the particles.

It is critical that the pre-milling of the ceramic and glass be performed separately. A one-step ball milling (or high energy ball milling) of mixture of synthesized CTZ+Mn and AF45 glass frits is not suitable to achieve the above-mentioned uniform microstructure. This is because in order to crush coarse glass frits (generally with a particles size ~10-50 μm) and mill them into nanosized particles (e.g., ~50-200 nm), a high-energy ball milling process is necessary. Unfortunately, high energy milling which typically uses high ball/powder weight ratios, e.g., >30:1 will over-crush the CTZ+Mn particles, resulting in crushing both secondary aggregates and the primary particles into smaller pieces.

BRIEF DESCRIPTION OF THE DRAWINGS

FIG. 18B illustrates a Type II SLC: with buried electrodes.

FIG. 18C illustrate a MLCC based on Type II SLC.

FIG. 19A are photographs of Type I SLC processed prototypes based on CTZ+Mn-based dielectric.

FIG. 19B is an enlarged photograph of a Type I SLC prototype based on CTZ+Mn-based dielectric.

FIG. 19C is a SEM image of a SLC cross-section that shows the dielectric and electrode layers.

FIG. 20 is a graph that depicts TCC and tan $\delta$ performance tests on preliminary CTZ-based SLC prototypes.

DETAILED DESCRIPTION OF PREFERRED EMBODIMENTS

Figure 1:
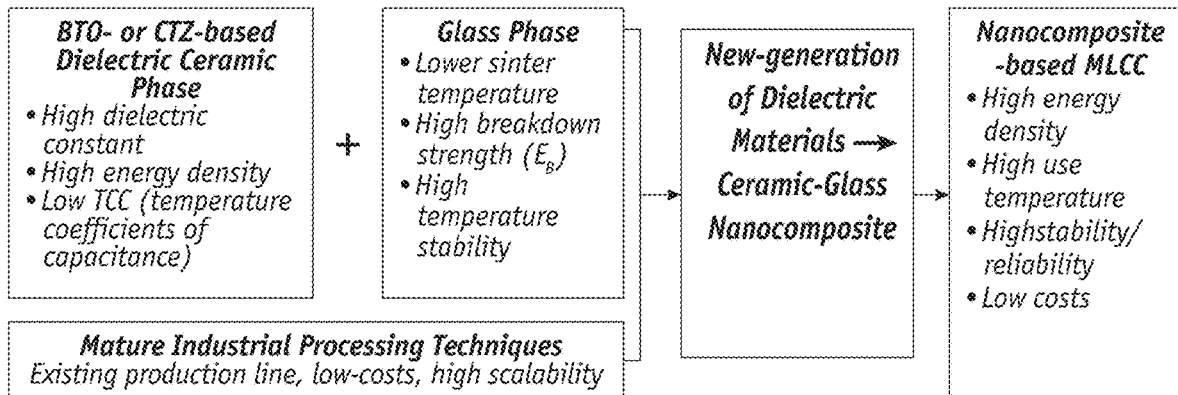
FIG. 1 is a process for making MLCC using spherical ceramic-glass nanocomposite dielectrics.

The invention is directed to manufacturing spherical ceramic-glass nanocomposite dielectric powders for use in multilayer ceramic capacitors. Separately pre-milled ceramics and glasses are employed as starting materials. While the invention will be described using CTZ+Mn or BTO ceramics and AF45 glass, it is understood that other ceramics and glass substances can be employed. In particular, the ceramic starting material can include titania, zirconia, calcium oxide, baria, alumina, silica, magnesia or the like. The glass, can be formed from Si, Al and O, B, Ca, Mg, Sr, Ba, V, Cr, Mn, Co, Ni, Ga, Y, Zr, Nb, Mo, Tc, In, Sn, Ta, W, Re, and Bi. These elements may be contained in the form of a complex oxide comprising two types or more of metallic elements among the aforementioned elements.

1. Material Designs

Nanocomposite dielectrics based on two types of ceramics (including CTZ+Mn based Class I linear dielectrics and BTO-based Class II non-linear dielectrics) were designed and developed, with the aim of achieving both high voltage (e.g., 600V-1500V) and low voltage (e.g., 5V-150V) applications. MLCCs made with the inventive nanocomposite dielectrics will exhibit numerous advantages such as: (1) enhanced energy density (>2 J/cc or more vs. ~0.2-1.0 J/cc state-of-the-art); (2) high temperature capability (>200° C.) and high stability (low temperature coefficient of capacitance, TCC, i.e., $\Delta C/C_{25°C}$ is within ±15% across −55° C. to 200° C.); (3) high operating voltage capabilities, and large voltage ranges that can be adjustable from low voltages (e.g. 5-150 V) to high voltages (up to 1500 V or more); and (4) lower costs (lower processing temperatures as a result of using a glass phase allows for the use of less expensive electrode materials such as 70/30 Ag/Pd alloys or even Cu or Ni, instead of Pt).

Industrial MLCCs are typically based on ferroelectric barium titanate (BaTiO$_3$, BTO) materials with a Curie temperature (Tc)≈125° C. By employing selective compositional (e.g., rare earth doping) or microstructure modifications (e.g., core-shell microstructure), BTO-based MLCCs can operate at elevated temperatures greater than 125° C., meeting with EIA standard X8R specifications (X8R means the capacitor can operate in the temperature range of −55° C. to +150° C. with a capacitance change $\Delta C$ of at most ±15% based on the room temperature capacitance $C_{25°C}$, or for short, −55° C. to 150° C., $\Delta C/C_{25°C} \leq \pm 15\%$). With the introduction of high-temperature electronics (e.g., SiC or GaN based wide bandgap power devices) for military, aerospace, oil drilling, and other demanding applications, MLCCs in electronic devices are expected to withstand temperatures up to 200° C. or more, satisfying EIA X9R specifications (−55° C. to 200° C., $\Delta C/C_{25°C} \leq \pm 15\%$) yet with higher energy densities of more than 1 J/cc. These stringent requirements have been partially met by ceramic-glass nanocomposite dielectrics which have supplanted BTO-glass composites as a viable alternative for dielectrics and capacitors Relative to ceramic-polymer composites, ceramic-glass composites provide several advantages including: (1) remarkably reduced interfacial defects and porosity because of better wetting behavior between ceramic and glass; (2) much higher volumetric loading (>90%) of the high $\varepsilon_r$ ceramic in glass matrix (while for BTO-polymer, loading is typically ~25-30 vol. %); and (3) better thermal stability because of the intrinsic properties of ceramics and glasses based on various oxides, leading to improved TCC and reliability. As compared to MLCCs made with pure ceramic dielectrics, adding glass to ceramics should confer several benefits including (1) reduction of sintering temperature; (2) enhancement in sinterability (or density); and (3) suppression of grain growth during sintering. These potential benefits favor the development of high-performance power capacitors based on ceramic-glass composites (and nanocomposites).

Despite these promising advantages, the state-of-the-art BTO-glass composites are not adequate to meet the operating requirements of high-energy-density, high-voltage pulsed power capacitors. This is mainly due to the intrinsic property limitation of pure BTO in terms of (1) low breakdown strength ($E_B$) that will result in low energy densities (owing to the dominance of $E_B^2$ in the expression of dielectric energy density), and (2) significantly reduced dielectric constant, $\varepsilon_r$ (~1 order lower), and the induced low energy density under even moderate operating field (~0.05-0.1 MV/cm) because of the field tuning (saturation) effect. In addition, the less attractive TCC of pure BTOs also leads to property degradation at elevated temperatures.

Proper selection of a ceramic phase in a nanocomposite to replace pure BTO offers one solution to these issues. A promising strategy is the use of dielectrics with much higher $E_B$, moderate $\varepsilon_r$, and better TCCs such as Class I (or linear) dielectrics, for instance, CTZ+Mn. Compared to Class II dielectrics (e.g. BTO), although CTZ-based ceramics have low $\varepsilon_r$ (~10 to 200), they can provide much higher $E_B$ (~1.1-1.5 MV/cm vs. ~0.1 MV/cm of BTO), excellent TCC (~0) and lower dissipation factor (<0.01). It has been found that with manganese (Mn)-doping, the Ca(Ti$_{0.795}$Mn$_{0.005}$Zr$_{0.2}$)O$_3$ dielectric can provide maximum energy densities of ~7.00 J/cm$^3$ at a $E_B$ of ~1.1 MV/cm at room temperature, and ~5.36 J/cm$^3$ at ~1.0 MV/cm at 300° C. These materials can be used in place of BTO in ceramic-glass nanocomposite dielectrics.

Another more straightforward candidate is the BTO-based multi-phase composites consisting of an effective Curie-temperature (Tc) shifter such as (Bi$_{0.5}$Na$_{0.5}$)TiO$_3$ or PbTiO$_3$, so as to increase the Tc point and achieve high-temperature stability of resultant BTO-based composite dielectrics. Typical formulations that have been explored to meet the TCC requirements of the EIA X9R specifications include BaTiO$_3$—(Bi$_{0.5}$Na$_{0.5}$)TiO$_3$, BaTiO$_3$—Bi(Zn$_{0.5}$Ti$_{0.5}$)O$_3$, BaTiO$_3$—Pb(Ti$_{0.55}$Sn$_{0.45}$)O$_3$, and (Bi$_{0.5}$Na$_{0.5}$)TiO$_3$—BaTiO$_3$—CaTiO$_3$ systems. For instance, in the BaTiO$_3$—(Bi$_{0.5}$Na$_{0.5}$)TiO$_3$ system, the distortion/deformation of BTO crystal structure induced by the addition of (Bi$_{0.5}$Na$_{0.5}$)TiO$_3$ enhances the stable temperature characteristics of the dielectric properties of BTO, which is considered as an ideal material to shift the Curie temperature of BTO above 150° C. and up to 320° C.

In addition to the selection of desirable dielectric ceramic, a glass phase with high $E_B$ (particularly when combined with a Class I ceramic phase with relatively low $\varepsilon_r$ but high $E_B$) is also desired in order to provide high voltage and high energy density, because glass phase $E_B$ is an important factor that determines the final $E_B$ of the resultant ceramic-glass (other important factors include the sinterability, grain size, interfacial polarization, etc.). Conventionally used borosilicate-based glasses in BTO-glass dielectrics generally provide $E_B$~0.3-0.7 MV/cm. Although these values are much higher than that of pure BTO (~0.1 MV/cm), it is still not enough to enable high final $E_B$. A possible reason can be attributed to the much higher average field in glass phase (which can easily exceed the glass $E_B$) than that in ceramic phase. This is because the electric displacement ($D=\varepsilon_0\varepsilon_r E$) continuity across the ceramic-glass interface needs to be satisfied, so the large contrast of $\varepsilon_r$ between two phases results in much higher field strength in glass. Based on this reason, one straight forward solution is to use high $E_B$ glass accompanied with the usage of ceramics with relatively lower E (when comparing with that of pure BTO). Therefore, commercially available glass AF45 with high $E_B$ (~10 MV/cm) was selected.

FIG. 1 summarizes the construction of improved MLCCs using novel dielectric nanocomposites of the present invention. A dielectric ceramic phase and glass phase are combined using standard industrial processing techniques such as mechanical ball milling machines. The ceramic and glass phases are initially pre-milled separately in the ball milling machines at different ball-to-powder weight ratios as described herein.

Based on the above material design concepts, a series of compositions of ceramic-glass nanocomposite consisting of CTZ+Mn-based ceramic and AF45 glass with the formulated as shown in Table 1 were prepared.

TABLE 1

Composition Design-CTZ + Mn-AF45 Nanocomposite Dielectrics

| Sample # | Base Ceramic Phase | Percentage (wt. %) | Glass Phase AF 45 (wt. %) |
|---|---|---|---|
| C1 | CTZ + Mn | 90 | 10 |
| C2 | CTZ + Mn | 80 | 20 |
| C3 | CTZ + Mn | 70 | 30 |
| C4 | CTZ + Mn | 60 | 40 |

Compositions consisting of BTO-based ceramic and AF45 having the formulations as shown in Table 2 were also prepared.

TABLE 2

Composition Design-BTO-AF45 Nanocomposite Dielectrics

| Sample # | Base Phase | Ceramic Percentage (wt. %) | Glass Phase AF 45 (wt. %) |
|---|---|---|---|
| B1 | BTO-BNTO-TO | 80 | 20 |
| B2 | BTO-BNTO-TO | 75 | 25 |
| B3 | BTO-BNTO-TO | 70 | 30 |

2. Material Processing Development

Figure 2:
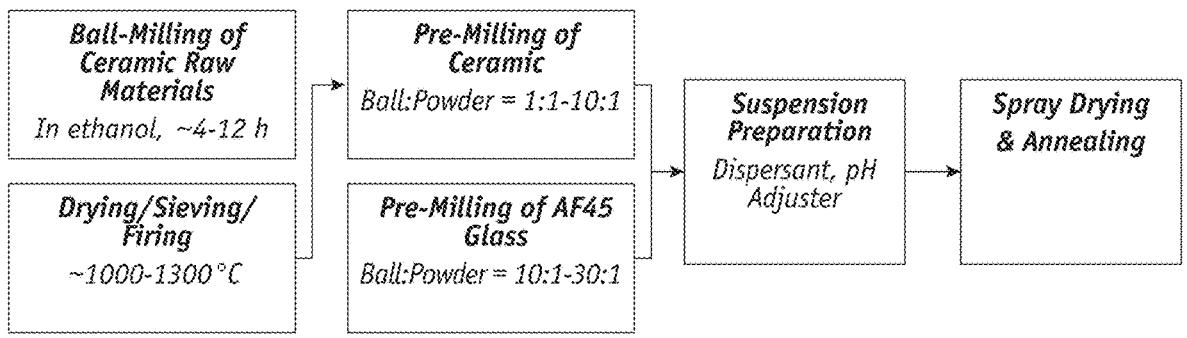
FIG. 2 is a process for fabricating ceramic-glass nanocomposite dielectrics.

The nanocomposites dielectrics can be processed in a cost-effective and scalable manner (as summarized in FIG. 2) with good consistency from batch-to-batch. The nanocomposite preparation was started with synthesis of ceramic phases including (1) CTZ+Mn, and (2) BTO-BNTO-TO. For CTZ+Mn, calcium carbonate ($CaCO_3$), titanium dioxide ($TiO_2$), zirconium dioxide ($ZrO_2$), manganese dioxide ($MnO_2$), were mixed stoichiometrically and milled via ball milling in ethanol medium for ~4-12 hours. Ball-to-powder weight ratio was ~5:1-20:1, and a ~300-400 rpm milling speed was used. After milling, the collected slurry was dried (~90° C., ~4 hours), crushed, and sieved (through a ~200 mesh), and the obtained mixture was then calcinated at ~800° C. for ~2-10 hours to fully decompose $CaCO_3$, and then ~1000-1300° C. for ~1-10 hours.

For BTO-BNTO-TO, its synthesis started with the synthesis of BNTO. Appropriate amounts of $Bi_2O_3$, $Na_2CO_3$, and $TiO_2$ were ball milled. Zirconia balls ($\phi$~5 mm) instead of stainless steel (SST) balls were used in order to avoid any possible contamination from metals. Ball-to-powder weight ratio was ~5:1-20:1, and a ~300-400 rpm milling speed was used. After milling, the collected slurry was dried (~90° C., ~4 hours), crushed, and sieved (through a ~200 mesh), and the obtained mixture was then calcinated at 800-850° C. for ~6-12 hrs. The obtained BNTO was mixed with determined amounts of as-received commercially available BTO and $Ta_2O_5$ based on the designed composition ($0.9BaTiO_3$-$0.1Bi_{0.5}Na_{0.5}TiO_3$-$0.02Ta_2O_5$), and ball milled in ethyl alcohol medium for ~12 hours, dried at ~90° C. for ~4 hours, and then calcinated at ~1000-1200° C. for ~1-4 hours.

The calcinated ceramic powders (both CTZ+Mn and BTO composite) needed to be pre-milled in order to crush the secondary aggregates which formed during synthesis. However, over-crushing the primary particles into smaller pieces should be avoided in order to facilitate the isolation of ceramic fillers in the glass matrix and depress the possible side-reactions between them. Therefore, properly designed milling parameters were employed including relatively lower ball to powder ratios (e.g., ~1:1 to 10:1) and shorter milling times (e.g., ~3-9 hours). After the crushing completed, the particles were dried at ~90° C. for ~4 hours, ready for the subsequent mixing with glass powders.

Glass phase, e.g., as received AF45 ($SiO_2$—BaO—$B_2O_3$—$Al_2O_3$) coarse frits, needed to be pre-milled into nanosized particles using high-energy ball milling. In this process, high ball-to-power weight ratios up to ~25:1 to 35:1 and long milling times up to ~9-16 hours were applied. Generally, after this high energy ball milling step, large glass frits with dimensions ~10-50 μm can be crushed and milled into smaller particles ~20-200 nm, suitable for processing the ceramic-glass nanocomposites. After drying and sieving through a ~200 mesh, the obtained glass nanoparticles were ready to be incorporated with ceramic dielectric to form nanocomposites.

Spherical powder samples of ceramic-glass nanocomposites were processed using spray-drying techniques according to the designed compositions set forth in Tables 1 and 2. After mixing the crushed ceramic powders with determined amounts of milled AF45 glass powders, the mixtures were then ball-milled in distilled water using the milling parameters similar as those established for ceramic crushing (i.e., ball to powder ~2:1 to 5:1, milling time ~1-10 hours) in order to achieve a homogenous mixture. After the milling was completed, the slurry was separated from the milling balls and then diluted by adding extra distilled waters to form slurry with a powder weight percentage ~5-30 wt. %. To make the slurry suitable for spray drying, additional surfactant/dispersant was used.

A surfactant or dispersant facilitates the formation of a uniform and stable dispersion of particles in a suspension system. In particular, for the nanocomposite system consisting of ceramic and glass phases with different densities, a stabilized suspension is important in order to avoid the possible precipitation and delamination. Therefore, several dispersants including oleic acid (OA), polyvinyl alcohol (PVA), polyvinylpyrrolidone (PVP), and polyacrylic acid (PAA) with different concentrations from ~0.2 wt. % to ~1 wt. % were tested. PAA was an effective dispersant for the nanocomposite system, and at least ~0.5 wt. % was needed to achieve a sufficiently stable suspension for the subsequent spraying process (i.e., there is no obvious precipitation and delamination observable in a certain period of time such as several hours).

Figure 3:
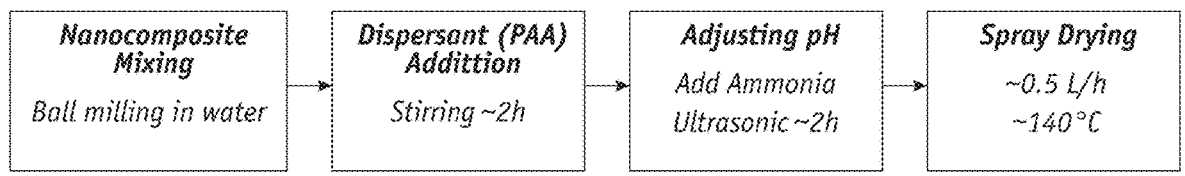
FIG. 3 depicts slurry preparation and spray drying steps.

In addition, a procedure for preparing the stable nanocomposite suspension and its associated spray drying was also established, as described in FIG. 3. In a typical process, determined amounts of PAA were added into the diluted slurry and magnetically stirred ~0.5-2 hours to achieve a uniform mixture. The pH of the obtained slurry was adjusted to ~9-10 with several drops of ammonia to change the slurry into a stable suspension. In order to further improve the homogeneity, the suspension was treated with ultrasonic for ~0.5-2 hours. The obtained sample was then spray dried at ~120-300° C. After spraying completed, the micro-spherical nanocomposite powders were collected and annealed at ~400-700° C., for ~2-4 hours, ready for the subsequent characterization or processing of dielectric discs and single- or multi-layer ceramic capacitor prototypes.

Figure 4:
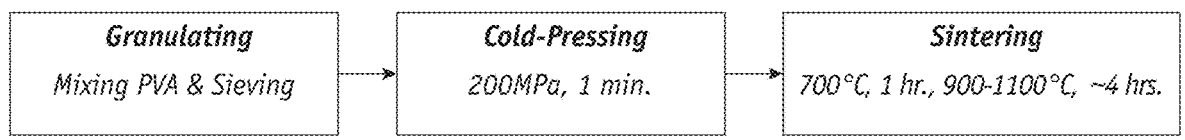
FIG. 4 depicts nanocomposite disc samples processing.

Disc samples of the ceramic-glass nanocomposites were processed, which were used for the characterization of microstructures and electric/dielectric properties. FIG. 4 shows the processing steps. Nanocomposite powders were first granulated using poly(vinyl alcohol)(PVA) binder to improve the flow ability of the powder and achieve an even distribution of powder mass during cold-compressing. PVA water solution (~3 wt. %) was mixed with nanocomposite powders based on a weight ratio of powder to liquid=6:1 for ~15 minutes until it was homogenous, and then was sieved through ~80 mesh SST sieve to complete the granulation. In the cold-compressing step, the granulated powders were uniaxially pressed into pellets (~9.5 mm diameter, ~0.6 mm thick) using a tool steel plunger and die at a pressure of ~200 MPa and held for ~1 minute. In the sintering step, the obtained green pellets were fired in air (with a ramp rate of ~2° C./min) at ~700° C. for ~1 hour with an aim of burning out PVA binders, and then the temperature was ramped (~5° C./min) to ~950-1150° C. and held for ~2-4 hours for the final sintering of the discs. This procedure was established mainly for the preparation of flat discs, which were suitable for dielectric characterization including properties of P-E (polarization vs. field strength), TCC (temperature coefficient of capacitance), and tan δ (lose factor), etc.

3. Microstructure Characterization

XRD analysis was used to determine whether desired crystalline structures and phases in the prepared materials have been achieved, and to investigate the influence of process parameters (such as calcination temperature, time, etc.) on the crystal structures.

Figure 5A:
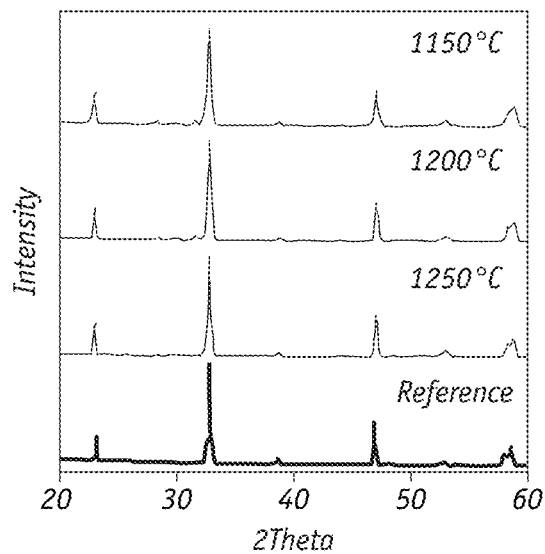
FIGS. 5A and 5B are x-ray diffraction (XRD) patterns of CTZ+Mn samples that were prepared at different temperatures and processing times.
Figure 5B:
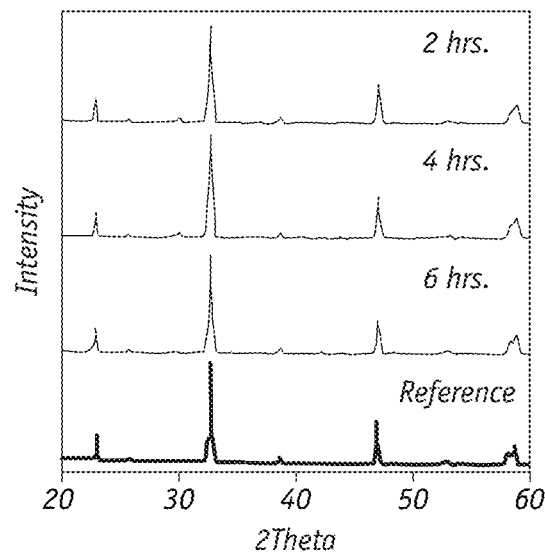

For CTZ-based samples, FIG. 5A shows the XRD patterns of the calcined CTZ+Mn samples with different temperatures (from 1150° C. to 1250° C.) but with the same time lengths of peak temperature (~6 hours). FIG. 5B shows the patterns of samples fired with the same temperature (~1250° C.) but at different time lengths (2 to 6 hours). From these figures it can be seen that in order to achieve pure phase CTZ+Mn, the processing parameters including temperature ~1250° C. and time ~6 hours are required. Based on this result, CTZ+Mn pure phase samples can be processed from batch to batch with good consistency.

Figure 6:
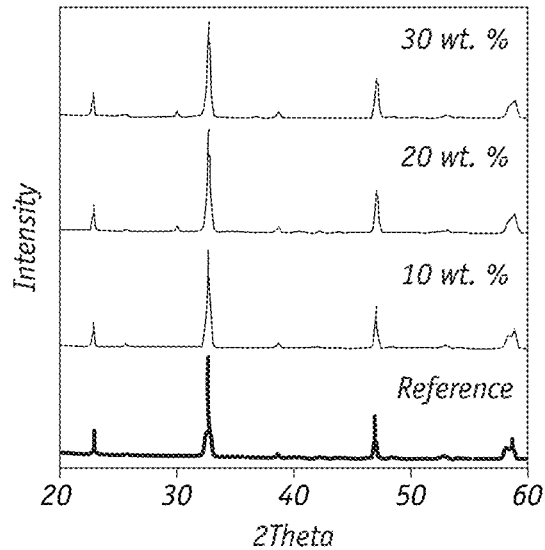
FIG. 6 are XRD patterns of CTZ+Mn+30 wt. % AF45 nanocomposite samples derived from spray drying different slurry concentrations (weight percentage of powders in the slurry).

XRD of CTZ-based ceramic-glass nanocomposite samples are shown in FIG. 6. These samples have the same composition (i.e., CTZ+Mn with 30 wt. % AF45, as shown in Table 1) but were spray dried with different concentrations of solid phase in the slurry. These XRD patterns were very similar to those of pure CTZ+Mn samples as shown in FIG. 5. The AF45 glass phase could not be distinguished from these patterns because of its amorphous nature. It was expected that there was little difference between the XRD patterns of the pure CTZ+Mn and the resultant (CTZ+Mn)-glass nanocomposites because of the non-crystalline feature of glass phase. In addition, it was found that the slurry concentration had relatively little influence on the phase purity of the nanocomposites.

Figure 7A:
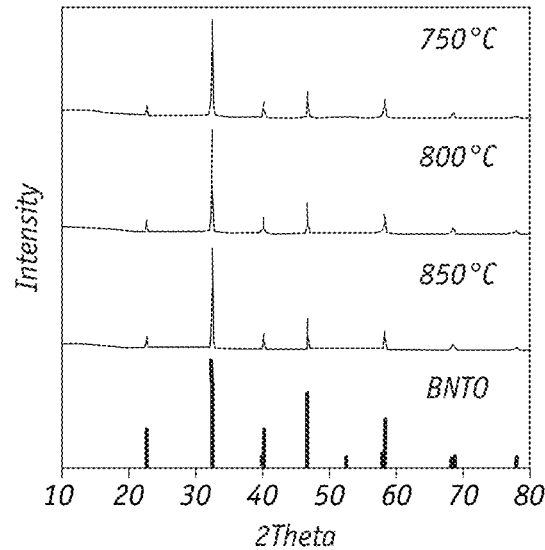
FIG. 7A are XRD patterns of BNTO samples prepared at different temperatures.

As for BTO-based samples, pure phase BNTO samples were first synchronized in order to prepare the proposed BTO-based nanocomposites. FIG. 7A shows the XRD patterns for the calcined BNTO samples with different temperatures (from 750° C. to 850° C.) but with the same time lengths of peak temperature (~12 hours). Standard pattern of BNTO (reference curve) is also shown. The XRD patterns show that overall, pure phase BNTO samples were obtained in all three samples and there were few impurity peaks in the patterns. These results indicate that the selected parameters were suitable for the preparation of BNTO pure phase samples.

Figure 7B:
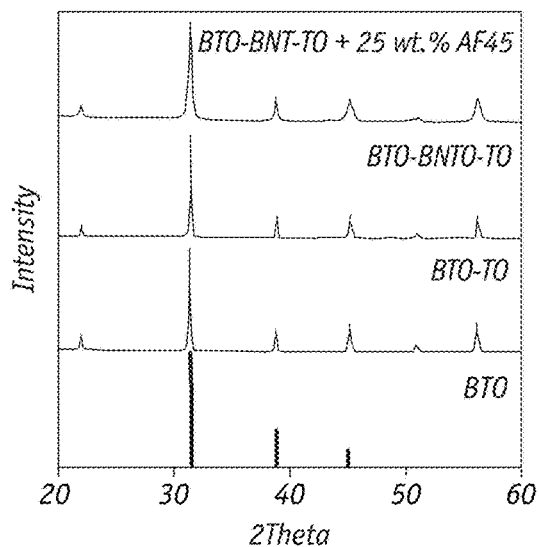
FIG. 7B are XRD patterns of BTO-based samples with different compositions.

FIG. 7B shows the XRD patterns for a typical spray dried BTO-based nanocomposite samples with the designed compositions (BTO-BNT-TO+25 wt. % AF45). Standard pattern of BTO (lower curve) is also shown. From the figure, it can be seen that the crystal structure of BTO was almost not influenced by the integration of those doping elements (i.e., Ta), new ceramic phase (i.e., BNTO), and glass phase (i.e., AF45). Also, no additional impurity peaks appeared in the obtained nanocomposite dielectric sample. These results indicated that the identified processing parameters, such as calcination temperatures, calcination times, milling times, etc., can be effectively applied for processing the proposed BTO-based nanocomposite dielectrics.

SEM has been used to examine the microstructural morphology (including particle size, shape, uniformity) of the prepared samples, since morphology influences the quality of tape-casted dielectric layers and the performance of resultant MLCCs.

Figure 8:
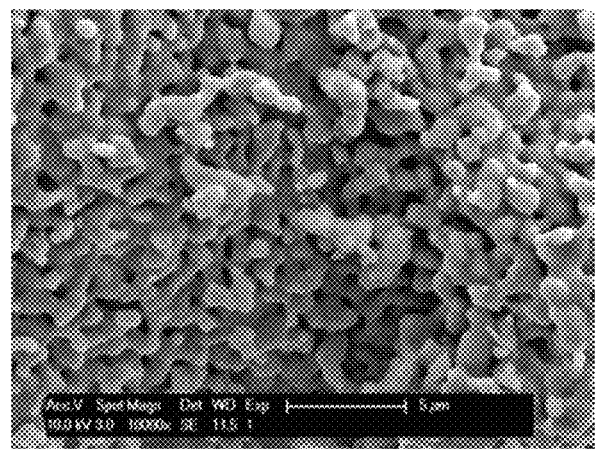
FIG. 8 is a scanning electron microscopy (SEM) image of a synthesized CTZ+Mn sample.

FIG. 8 shows representative SEM images of CTZ+Mn samples prepared at ~1250° C. It was apparent that the average size of CTZ+Mn particles increases with the processing temperatures, from ~200-300 nm (at ~1150° C., SEM is not shown for simplicity) to ~700-800 nm (at ~1250° C.), indicating the influence of temperatures on the particle sizes of samples. It was also found that the calcination time had relatively little influence on the overall particle dimensions. For the preparation of CTZ+Mn dielectrics, calcination temperature was a more dominant parameter than the time, not only for the phase purity, but also for the sample morphology.

Figure 9:
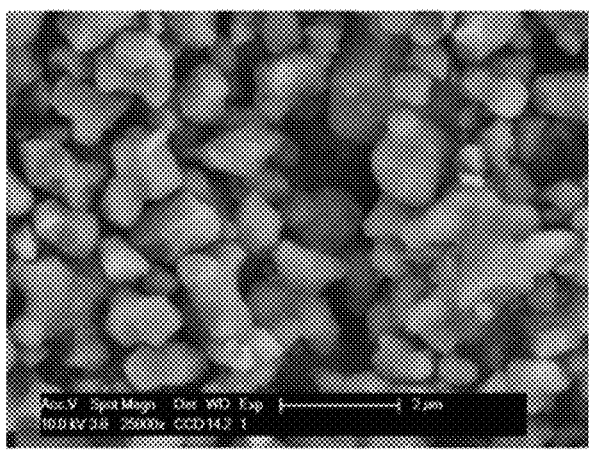
FIG. 9 is a SEM image of a crushed CTZ+Mn sample.

In addition, it is important to note that although the pure phase samples had relatively larger aggregations of primary particles, a proper ball milling process had been developed to crush the aggregations into fully separated primary particles. From the SEM results, it was determined that ball to powder=4:1 was a suitable ratio for this crushing purpose. FIG. 9 shows a typical SEM image of the crushed samples processed with ball to powder=4:1.

Figure 10A:
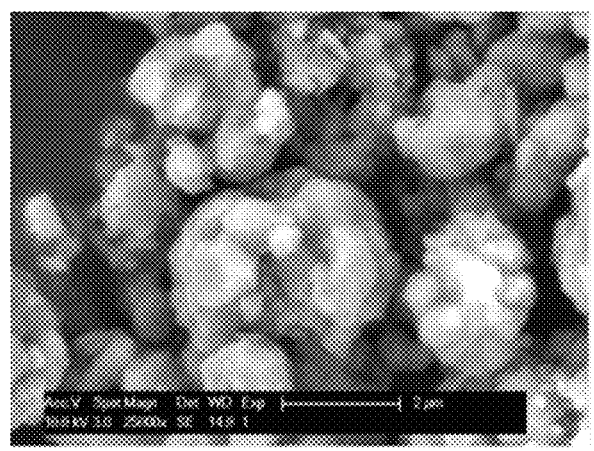
FIG. 10A is a SEM image of spray dried CTZ+Mn+30 wt. % AF45 nanocomposite sample (2 μm scale).
Figure 10B:
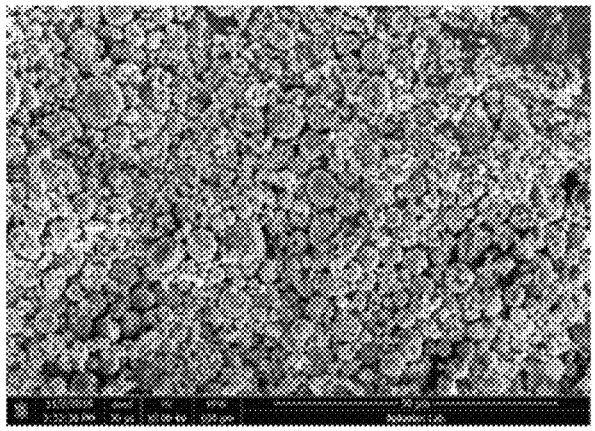
FIG. 10B is a SEM image of spray dried CTZ+Mn+30 wt. % AF45 nanocomposite sample (50 μm scale).

FIGS. 10A and B show the SEM of the spray dried nanocomposite powders collected. It can be seen that the relatively larger ceramic particles are surrounded by smaller glass particles, forming spherical shapes of clustered composite particles with various dimensions from ~2 μm to ~15 μm. Each composite particle is composed of several to tens of nano/submicron-scale ceramics and glass particles. This microstructure feature is consistent with the material design concept that we proposed for the utilization of spray drying technique. The obtained nanocomposite microspheres were further annealed at ~600° C. for ~4 hours, then were ready to be processed into discs and SLC samples for the subsequent microstructural and dielectric characterizations.

Figure 11:
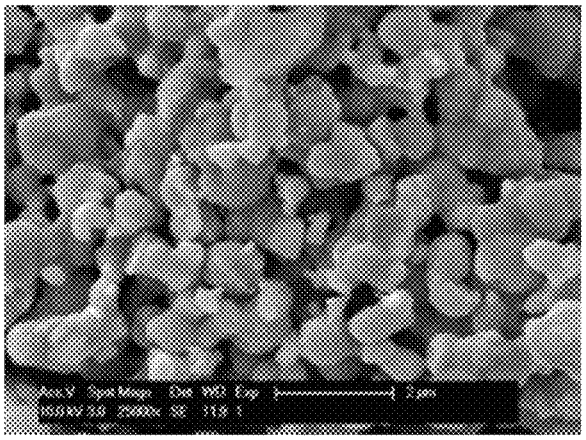
FIG. 11 is a SEM image of a synthesized BTO-BNTO-TO sample.

FIG. 11 shows a representative SEM image of a BTO-BNTO-TO sample prepared at 1100° C., ~2 hours. It can be seen that the average size of BTO-BNTO-TO particles increased from submicron-meters of original BTO to ~0.5-1.5 μm, although some aggregates of particles can be observed. These aggregates, however, can easily be crushed into separated particles in the subsequent crushing and mixing steps for the processing of nanocomposites.

Figure 12A:
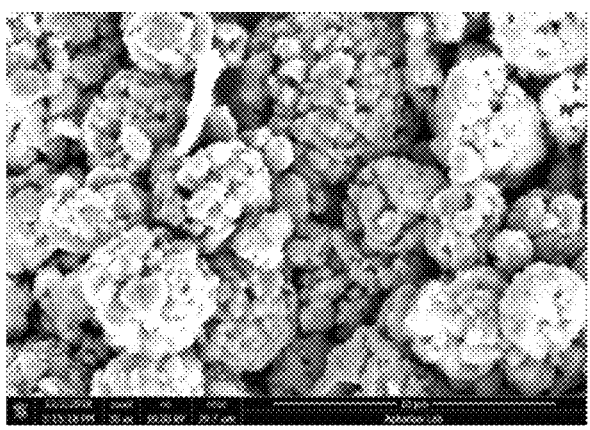
FIG. 12A is a SEM image of spray dried BTO-BNTO-TO+25 wt. % AF45 nanocomposite sample (10 μm scale).
Figure 12B:
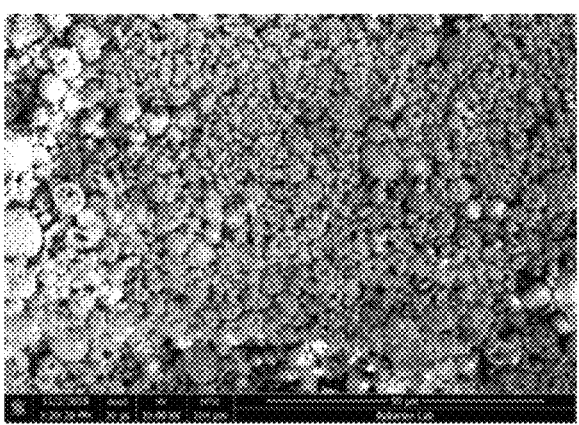
FIG. 12B is a SEM image of spray dried BTO-BNTO-TO+25 wt. % AF45 nanocomposite sample (50 μm scale).

BTO-based nanocomposite samples were also processed using the obtained BTO-BNTO-TO ceramics and the high energy ball milled AF45 glasses through the similar procedure as that for CTZ-based nanocomposites. FIGS. 12A and B show the representative SEM images of the obtained nanocomposite sample (with ~25 wt. % AF45). From the image, it is apparent that the particle aggregates found in BTO-BNTO-TO samples have been fully crushed into smaller primary particles, and the obtained spherical nanocomposites clusters consist of both relatively larger particles (~1 m) of ceramic phase (BTO-BNTO-TO) and smaller particles (<200 nm) of glass phase (AF45). Good homogeneity has been achieved in this sample for both phases, and no obvious aggregates can be found.

Figure 13A:
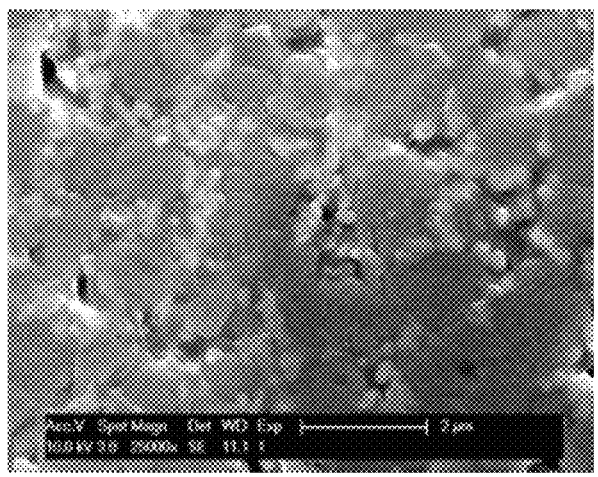
FIG. 13A is a SEM image of a sintered disc sample of CTZ+Mn based nanocomposite with ~30 wt. % glass.
Figure 13B:
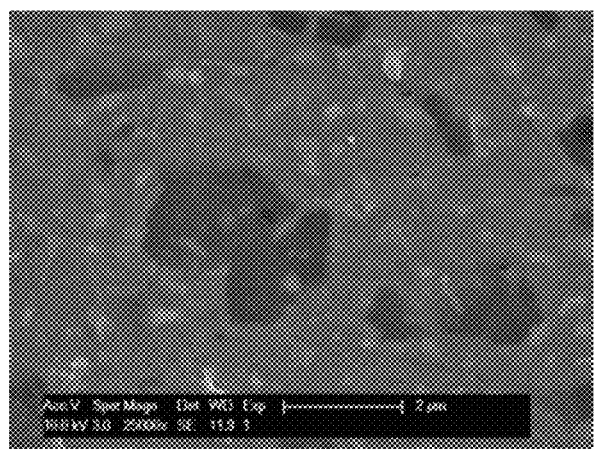
FIG. 13B is a SEM image of a sintered disc sample of BTO-based nanocomposite with ~25 wt. % glass.

The microstructure morphology of sintered disc samples were also examined using SEM. FIG. 13A shows a SEM image of sintered disc of CTZ-based nanocomposite, while FIG. 13B shows a BTO-based nanocomposites disc. Overall from these images, the sintered samples exhibit desirable sinterabilities (implying low porosities and high densities, which are favorable for high $E_B$). This is consistent with the measured densities of these disc samples (>97% of theoretical values). In addition, from the images, it is apparent that the two phases (ceramic and glass phases) are well distinguishable, and ceramic grains are embedded in the glass matrix phase with very obvious grain boundaries (as confirmed by the EDS analysis results described herein). Furthermore, there are no noticeable defects that can be found on the interfaces of these two phases, indicating good wettability of glass on the ceramic particles.

Figure 14:
FIG. 14 is a SEM image of a CTZ+Mn-based nanocomposite disc sample with ~30 wt. % glass used for EDS point analysis.

Energy-disperse x-ray spectroscopy (EDS) point analysis on a CTZ+Mn-based disc sample with ~30 wt. % glass examined the glass phase distribution around the ceramic grain, as shown in FIG. 14. Corresponding proportions of ceramic elements (Ca, Ti, Zr) and no atom percentage (at. %) of glass elements (Si, and Ba) were detected on point #1, #3, and #4 (ceramic grain) shown in FIG. 14. Table 3 lists the elements at these 4 points.

At point #2 (glass phase), much higher percentages of Si (~6.30) and Ba (~4.22) were found suggesting that the glass phase is mainly distributed around the grain of ceramic phase. These results are consistent with the material design concept wherein ceramic filler particles are embedded in glass matrix, with the aim of combining the relatively high dielectric constant ($\varepsilon_r$) of ceramic phase and the high breakdown strength ($E_B$) of glass phase.

4. Dielectric Characterizations

Disc samples of dielectric nanocomposites were via cold-pressing and subsequent sintering for property characterizations. Properties characterized included dielectric constants ($\varepsilon_r$), TCC, dielectric loss (tan δ), breakdown strength ($E_B$), and energy density ($U_E$). Using the disc samples, preliminary dielectric properties of the developed nanocomposites were characterized, including: (1) measurements of polarization vs. field (P-E), which are used to extract dielectric constant ($\varepsilon_r$), energy density ($U_E$, associates to the highest field strength in P-E); (2) measurements of breakdown strength ($E_B$), which are used to calculate the associated material level energy density ($U_{EB}$) based on the obtained $U_E$ values in P-E; and (3) measurements of TCC and dielectric loss (tan δ) in a determined temperature range (e.g., −60° C. to 270° C.).

Figure 15:
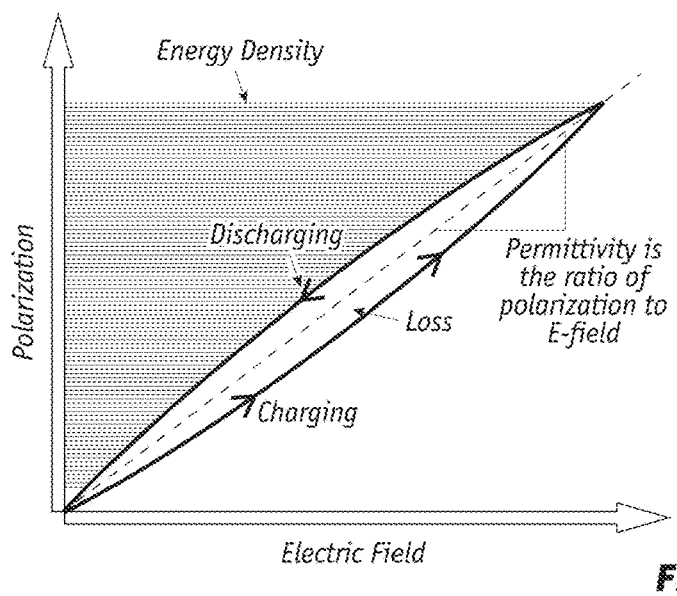
FIG. 15 is a graph depicting how $\varepsilon$, $U_E$, and tan $\delta$ are quantified based on a P-E profile.

FIG. 15 is a schematic illustrating how $\varepsilon_r$, $U_E$, and tan δ are extracted from a P-E hysteresis loop. $U_E$ for a dielectric material can be calculated through an area enclosed by the decreasing field part of the P-E profile, which can be expressed as $U_E=\int E(P)dP$, where the electric polarization, P, is used to approximate the dielectric displacement because of $\varepsilon_r \gg 1$. Moreover, the area in the loop is an estimation of energy loss (tan δ). Permittivity (ε) of sample can be calculated from the ratio of P to E (as also shown in FIG. 15), and $\varepsilon_r$ (or relative permittivity) can be further calculated based on the relation $\varepsilon_r=\varepsilon/\varepsilon_0$, where $\varepsilon_0$ (~8.85×10$^{-12}$ F/m) is the permittivity of vacuum.

Figure 16A:
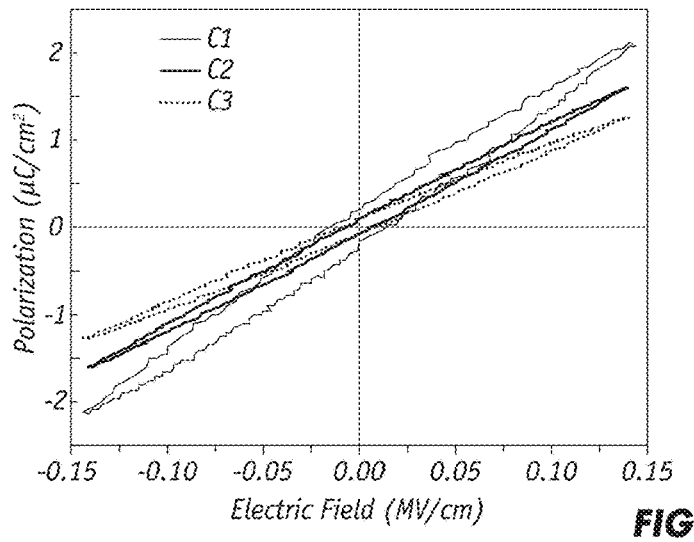
FIG. 16A are P-E profiles of CTZ+Mn based nanocomposite dielectrics (C1-C3).

For CTZ+Mn-based nanocomposite disc samples, results were obtained on discs with glass fractions from 10 wt. % to 30 wt. % which were sintered at ~1100° C. for ~4 hours. FIG. 16A shows representative P-E loops of the CTZ+Mn-based disc samples. From the graph, it is apparent that these samples exhibit very typical P-E profiles of standard linear (Class I) dielectrics, particularly when compared to those profiles of pure BTO-based sample. It is also apparent that the electric field strengths in FIG. 16A are much higher than those of pure BTO-based samples, indicating that CTZ-based dielectrics are more suitable for high voltage applications. Table 4 sets forth the $E_B$, $U_{EB}$, and tan δ (room temperature) of these samples. The data demonstrates that all C1-C3 samples exhibit much lower tan δ values than that of the pure BTO+21 wt. % AF45 sample. For example, C3 has the highest tan δ (~2.8×10$^{-3}$), which is only in the range of ~15-30% of that of the pure BTO-based sample. These values are well comparable to those of commercially available products which are typically around ~2.5×10$^{-3}$.

TABLE 3

| Point | Ca (at. %) | Ti (at. %) | Zr (at. %) | O (at. %) | Si (at. %) | Ba (at. %) |
|---|---|---|---|---|---|---|
| #1 | 20.80 | 20.87 | 1.06 | 56.66 | — | — |
| #2 | 8.10 | 6.79 | 9.81 | 65.78 | 6.30 | 4.22 |
| #3 | 21.30 | 23.06 | 0.80 | 54.61 | — | — |
| #4 | 21.39 | 21.83 | 1.43 | 55.33 | — | — |

TABLE 4

Summary of obtained $E_B$, $U_{EB}$, and tan δ of CTZ + Mn-based disc samples

| Sample | C1 | C2 | C3 |
|---|---|---|---|
| $E_B$ (MV/CM) | 0.33 | 0.43 | 0.68 |
| $U_{EB}$ (J/cc) | 0.71 | 1.06 | 2.02 |
| Tan δ (×10$^{-3}$) | 1.57 | 2.83 | 2.67 |

Figure 16B:
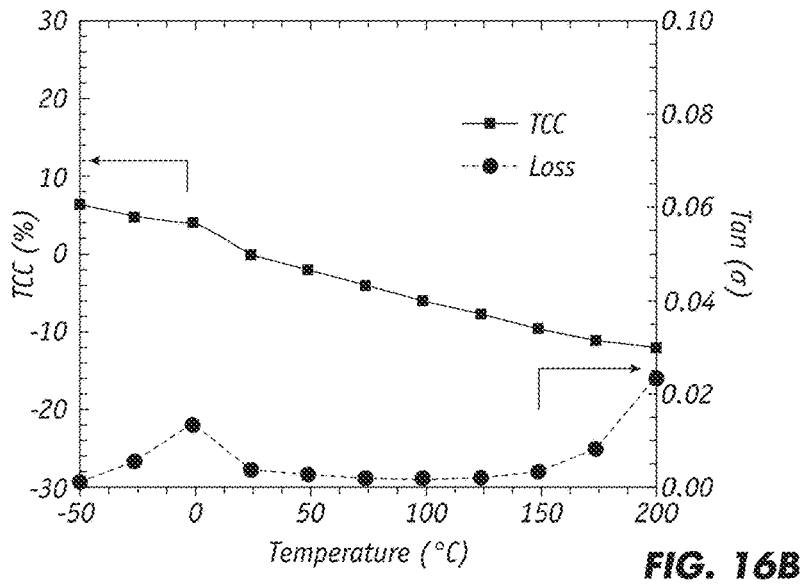
FIG. 16B is a graph depicting TCC and tan $\delta$ vs. temperature of CTZ+Mn based nanocomposite dielectric (C3).

TCC of a disc sample with a composition of CTZ+Mn-30 wt. % AF45 was examined by measuring the capacitance vs. temperature across −50° C. to 200° C. at frequencies ranging from 0.1 kHz to 10 kHz. For simplicity, only representative profiles of TCC and tan δ measured at 1 kHz from −50° C. to 200° C. are shown in FIG. 16B. As shown, a very good TCC (within ±12.5%) across a wide temperature range (−50° C. to 200° C.) was obtained. This indicates that the dielectrics provide a stable capacitance as a function of temperature. As a corollary, MLCCs made from these dielectrics should qualify as EIA standard X9R (requiring TCC (or $\Delta C/C_{25° C.}$) varies within +15% across −55 and +200° C., where $C_{25° C.}$ means the capacitance at 25° C.), that will be very attractive for high temperatures (>160° C.) applications.

Figure 17A:
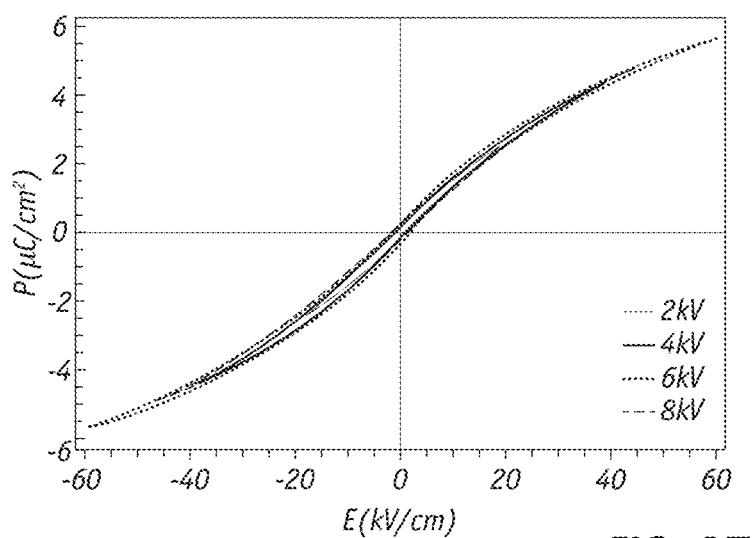
FIG. 17A are P-E profiles of BTO-based nanocomposite dielectrics (B2).
Figure 17B:
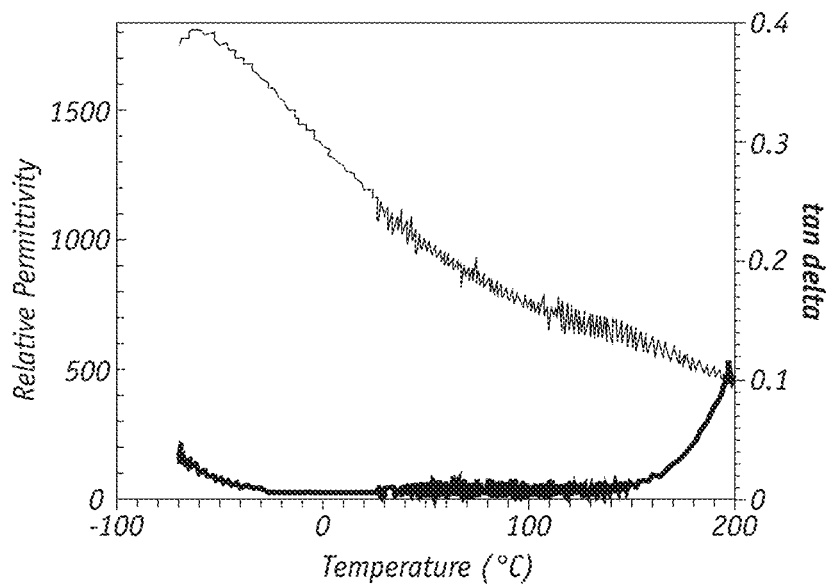
FIG. 17B is a graph depicting $\varepsilon_r$ and tan $\delta$ vs. temperature of BTO-based nanocomposite dielectrics (B2).

A BTO-based nanocomposite disc sample with a composition of BTO-BNTO-TO+25 wt. % AF45, which was sintered at ~950° C. for ~4 hours, was tested. FIG. 17A shows representative P-E profiles with different peak E values, and FIG. 17B shows the measured relative permittivity (i.e., dielectric constant) and tan δ curves versus the environmental temperature. From FIG. 17A, it can be determined that the BTO-based dielectric exhibited a typical Class II nonlinear P-E profile, which is featured with smoothly decreased relative permittivity with the increase of the field strength (E). This is consistent with the dielectric behavior of pure BTO materials. However, the area inside the P-E loop is much smaller when compared with that of pure BTO samples, indicating the much lower lose factor (tan δ) of the developed material. This is confirmed by FIG. 17B which shows that in the temperature range of −55° C. to 150° C., tan δ of this sample is confined to the range of ~0.01-0.02, although it increased to ~0.1 at ~200° C. This is much lower than those typical lose factors (0.2-0.7) of pure BTO samples.

In addition, as shown in FIG. 17B, the dielectric constant of the nanocomposite decreases from ~1750 to ~500 when the temperature increased from −55° C. to 200° C., and provides $\varepsilon_r$~1200 at room temperature. This is also normal for BTO-based Class II dielectrics. Based on this information, the energy density of the material is estimated ~1.9 J/cc, which is very good when compared to those of typical BTO samples (<1 J/cc).

5. Single Layer Capacitors (SLCs) and Multi-Layer Ceramic Capacitors (MLCCs) Incorporating Novel Ceramic-Glass Nanocomposite Dielectric Materials.

Figure 18A:
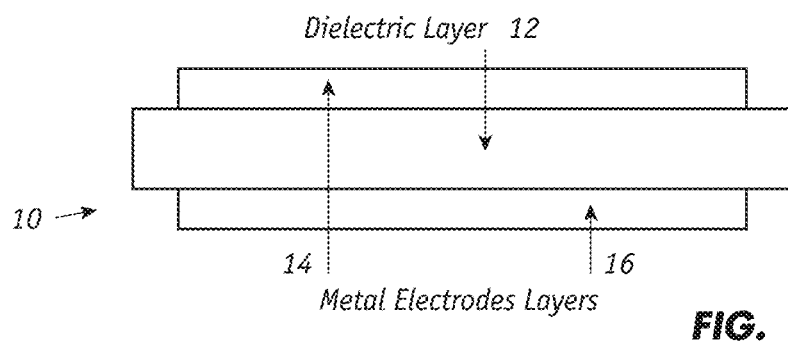
FIG. 18A illustrates a Type I SLC: with exposed electrodes.

Two types of SLC prototypes were prepared. In the Type I SLC 10, as shown in the cross-sectional view in FIG. 18A, the active dielectric layer 12 is sandwiched by two exposed metal electrode layers 14, 16 without further termination. These SLC prototypes were used for processing investigation and property characterizations. In the Type II SLC 20, as shown in FIG. 18B, electrodes layers 22, 24 are buried in inactive dielectric layers 26 and further terminated using Ag pastes. Type II SLC prototypes share characteristics of actual MLCCs and SLC prototyping process (via tape casting and subsequent co-sintering) can be used in MLCC prototyping. FIG. 18C depicts a cross-sectional view a MLCC 40 that includes a ceramic body 40, a pair of external electrodes 46, 48 positioned at two opposite sides of the body 40, a plurality of dielectric layers 42 which are stacked on top of another, and a plurality of internal electrodes 42, 44 each of which is positioned on top of the dielectric layers. The internal electrodes and dielectric layers are alternatively stacked as an integral body and the two internal electrodes adjacent to each other are electrically connected to two corresponding external electrodes. The dielectric layers are made from the novel spherical ceramic-glass nanocomposite material and the internal and external electrodes are made of a conductive paste of suitable metal powder.

In practice, so-called green sheets comprising the dielectric material having a thin sheet shape are formed from the slurry by using a doctor blade coating or a tape casting method. The internal electrode patterns made of the conductive paste are printed on the top surfaces of portions of the green sheets by using a screen printing method and are dried to form so-called printed green sheets. Next, the printed green sheets are stacked and then bare dielectric green sheets are stacked against the outermost sheets of the stacked ceramic green sheets to serve as a protecting layer, thereby forming a laminated ceramic body. Subsequently, the laminated ceramic body is pressed in a direction in which the sheets are stacked, and diced into chip-shaped multilayered ceramic bodies. Thereafter, the chip-shaped multilayered ceramic bodies are loaded into a furnace to undergo a firing process.

FIGS. 19A and B are photographs prepared Type I SLC prototypes, which consist of a single dielectric layer and two co-fired Ag—Pd electrodes layers on top and bottom surfaces, respectively. From FIG. 19B, it can be seen that the SLC has some deformation, which can be attributed to the much-reduced thickness (~0.2 mm) and the processing parameters. In FIG. 19C, the SEM image of a polished cross-section of a co-fired piece reveals a reasonably dense and uniform microstructure with some pores.

FIG. 20 shows the measured TCC and tan δ. When comparing these results with those of disc samples, it is evident that even further enhanced performance was achieved. For example, at room temperature, tan δ of SLC was even better than of discs (~$1.0 \times 10^{-3}$ vs. ~$3.8 \times 10^{-3}$), while at the same high temperature (~200° C.), SLCs showed a slightly better TCC (~10.9% vs. ~12.5% of disc), but a lower tan δ (~$3 \times 10^3$ vs. ~$2.3 \times 10^{-2}$ of disc).

Figure 21:
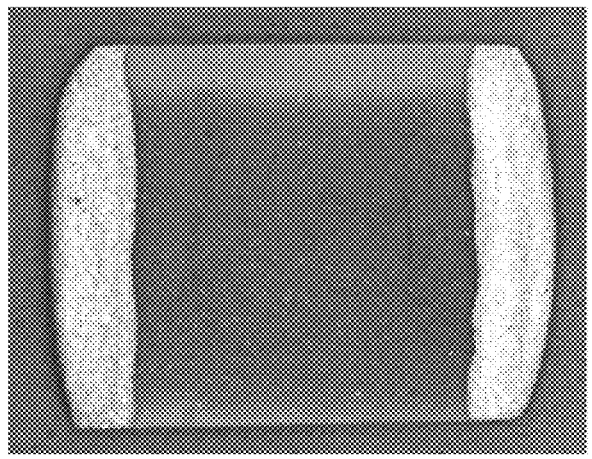
FIG. 21 is an optical image of a CTZ+Mn-based Type II SLC prototype.
Figure 22A:
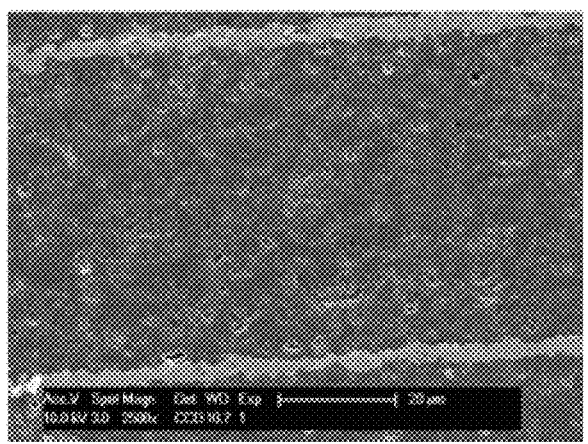
FIG. 22A is a cross-section SEM image of a CTZ+Mn-based Type II SLC prototype.
Figure 22B:
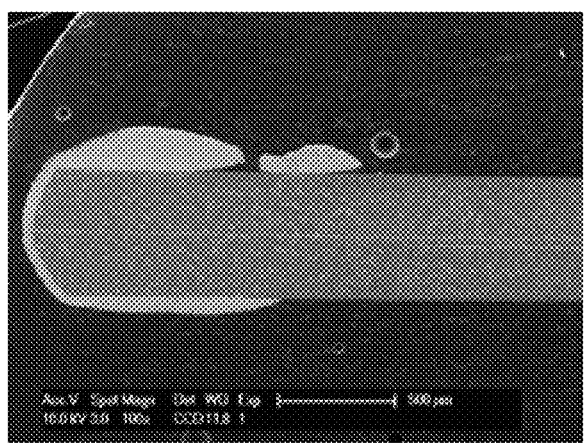
FIG. 22B is a cross-section SEM image of electrode end with Ag termination of a CTZ+Mn-based Type II SLC prototype.

In the first batch of prototyping which focused on Type I SLC, a relatively high thickness was used for easy processing and relatively low sintering temperatures were used to avoid potential severe sample deformation. In addition, Ag—Pd electrode layers were just painted by hand onto dielectric tape surfaces. In the subsequent batch, based on the preliminarily processing parameters, a thinner tape (~30-60 m) was prepared. In the meantime, Ag—Pd electrode layers was screen-printed onto the prepared tapes, and further buried in the stacked bare tapes, resulting in Type II SLC construction, as shown in FIG. 18B, that is similar to conventional MLCCs but with only one active dielectric layer between two electrodes. Also, preliminarily optimized sintering temperature (~1100° C.) was used to enhance sinterability. Once fabrication procedures are demonstrated successfully with the SLCs, the protocols are can be transitioned to MLCC prototypes by stacking electrode tapes instead of bare ones. A prototype of Type II SLC based on CTZ-based nanocomposite dielectrics is shown in FIG. 21. Typical SEM of SLC cross-sectional images are shown in FIGS. 22A and B.

Figure 23:
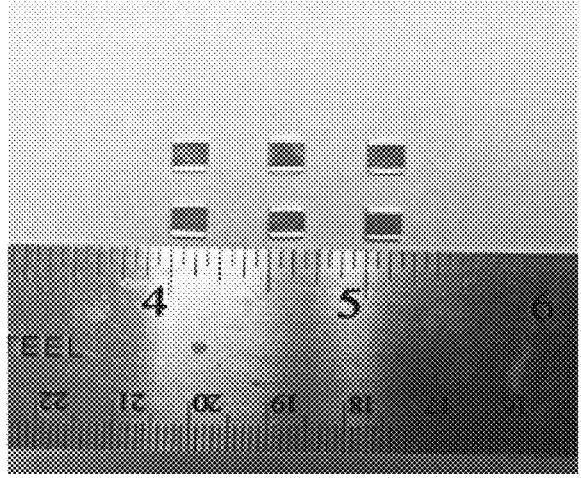
FIG. 23 is an optical image of CTZ+Mn based MLCC prototypes.
Figure 24A:
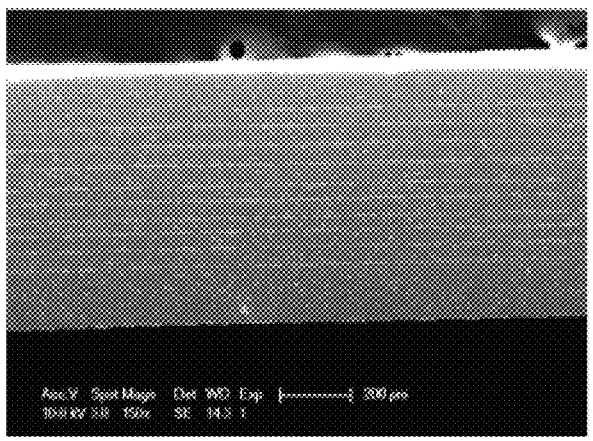
FIG. 24A is a cross-section SEM image of a CTZ+Mn based MLCC prototype.
Figure 24B:
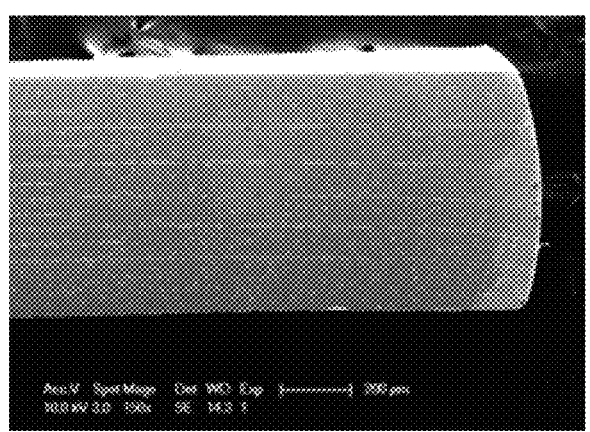
FIG. 24B is a cross-section SEM image of electrode end without Ag termination of a CTZ+Mn based MLCC.

Based on the processing parameters identified in the SLC prototyping, MLCC prototypes using CTZ+Mn-based nanocomposites were prepared, as shown in FIG. 23. The appearance of MLCC prototypes are almost the same with that of Type II SLCs because of their similar construction (FIGS. 18A and B). FIGS. 24B and B are SEM images of polished cross-sections of a prepared MLCC prototype. In this sample, a total of 10 electrode layers were used (5 electrodes for each terminal) to sandwich 9 active dielectric layers. As shown in FIG. 24A, the average thickness of active dielectric layers is ~50 μm, and the thickness of the electrode is ~5 μm. Also, the thickness uniformity of each single dielectric layer is good, while there are some variations between different layers. The variations may be attributed to thickness differences between casted tapes, particularly from different batches. FIG. 24B shows one end of the MLCC sample. Electrodes can be extended to the end of MLCC so that that they can be connected together by an Ag terminal (not shown).

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of preparing spherical ceramic-glass nanocomposite dielectric powders that comprises: (a) milling a ceramic substance to yield ceramic particles; (b) milling a glass substance to yield glass nanoparticles; (c) forming a suspension slurry comprising of the ceramic particles and glass nanoparticles; (d) spray drying the suspension slurry to yield spherical nanocomposite granular powder; and (e) annealing the spherical nanocomposite granular powder at a temperature of about 400 to 700 degrees C. for about 0.5 to 4 hours.

2. The method of claim 1 wherein the ceramic substance is a calcium titanate zirconate with manganese-doping-based dielectric ceramic or a barium titanate-based dielectric ceramic.

3. The method of claim 1 wherein the glass is an alkali-free borosilicate glass.

4. The method of claim 1 wherein step (a) employs low energy ball milling with a ball to powder weight ratio of from about 1:1 to 10:1.

5. The method of claim 1 wherein step (b) employs high energy ball milling with a ball to powder weight ratio of from about 20:1 to 40:1.

6. The method of claim 1 wherein step (c) comprises mixing the ceramic particles and glass nanoparticles together to form a mixture that is then ball milled with a ball to powder weight ratio of from about 1:1 to 10:1 for about 1 to 10 hours.

7. The method of claim 1 wherein step (c) comprises subjecting the suspension slurry to ultrasonic before being spray dried.

8. A method of preparing spherical ceramic-glass nanocomposite dielectric powders that comprises: (a) milling a ceramic substance to yield ceramic particles; (b) milling a glass substance to yield glass nanoparticles; (c) forming a suspension slurry comprising of the ceramic particles and glass nanoparticles; (d) spray drying the suspension slurry to yield spherical nanocomposite granular powder; and (e) annealing the spherical nanocomposite granular powder wherein step (c) comprises (i) mixing the ceramic particles and glass nanoparticles together to form a mixture that is then ball milled in an aqueous medium to form a milled slurry, (ii) diluting the milled slurry with water to form a diluted slurry having a weight ratio of water to powder of about 1:1 to 20:1, (iii) adding a dispersant to the diluted slurry and mixing the diluted slurry to form a uniform slurry mixture, and (iv) adjusting the pH of the slurry mixture of about 9-10 to form a stable suspension.

9. The method of claim 8 wherein the ceramic substance is a calcium titanate zirconate with manganese-doping-based dielectric ceramic or a barium titanate-based dielectric ceramic.

10. The method of claim 8 wherein the glass is an alkali-free borosilicate glass.

11. The method of claim 8 wherein step (a) employs low energy ball milling with a ball to powder weight ratio of from about 1:1 to 10:1.

12. The method of claim 8 wherein step (b) employs high energy ball milling with a ball to powder weight ratio of from about 20:1 to 40:1.

13. The method of claim 8 wherein step (c) comprises mixing the ceramic particles and glass nanoparticles together to form a mixture that is then ball milled with a ball to powder weight ratio of from about 1:1 to 10:1 for about 1 to 10 hours.

14. The method of claim 8 wherein step (c) comprises subjecting the suspension slurry to ultrasonic before being spray dried.

15. A method for manufacturing a multilayer ceramic capacitor that includes a multilayer ceramic body including alternately stacked ceramic layers and internal electrodes, comprising: (a) forming a laminated ceramic body which has alternating stacked ceramic green sheets and internal electrode patterns; (b) sintering the laminated ceramic body, wherein the ceramic green sheets comprise spherical ceramic-glass nanocomposite dielectric powders which are made in a process that comprises: (i) milling a ceramic substance to yield ceramic particles; (ii) milling a glass substance to yield glass nanoparticles; (iii) forming a suspension slurry comprising of the ceramic particles and glass nanoparticles; (iv) spray drying the suspension slurry to yield spherical nanocomposite granular powder; and (v) annealing the spherical nanocomposite granular powder at a temperature of about 400 to 700 degrees C. for about 0.5 to 4 hours.

16. The method of claim 15 wherein the ceramic substance is a calcium titanate zirconate with manganese-doping-based dielectric ceramic or a barium titanate-based dielectric ceramic.

17. The method of claim 15 wherein the glass is an alkali-free borosilicate glass.

18. The method of claim 15 wherein step (a) employs low energy ball milling with a ball to powder weight ratio of from about 1:1 to 10:1.

19. The method of claim 15 wherein step (b) employs high energy ball milling with a ball to powder weight ratio of from about 20:1 to 40:1.

20. A method for manufacturing a multilayer ceramic capacitor that includes a multilayer ceramic body including alternately stacked ceramic layers and internal electrodes, comprising: (a) forming a laminated ceramic body which has alternating stacked ceramic green sheets and internal electrode patterns; (b) sintering the laminated ceramic body, wherein the ceramic green sheets comprise spherical ceramic-glass nanocomposite dielectric powders which are made in a process that comprises: (i) milling a ceramic substance to yield ceramic particles; (ii) milling a glass substance to yield glass nanoparticles; (iii) forming a suspension slurry comprising of the ceramic particles and glass nanoparticles; (iv) spray drying the suspension slurry to yield spherical nanocomposite granular powder; and (v) annealing the spherical nanocomposite granular powder wherein step (iii) comprises (1) mixing the ceramic particles and glass nanoparticles together to form a mixture that is then ball milled in an aqueous medium to form a milled slurry, (2) diluting the milled slurry with water to form a diluted slurry having a weight ratio of water to powder of about 1:1 to 20:1, (3) adding a dispersant to the diluted slurry and mixing the diluted slurry to form a uniform slurry mixture, and (4) adjusting the pH of the slurry mixture of about 9-10 to form a stable suspension.

21. The method of claim 20 wherein the ceramic substance is a calcium titanate zirconate with manganese-doping-based dielectric ceramic or a barium titanate-based dielectric ceramic.

22. The method of claim 20 wherein the glass is an alkali-free borosilicate glass.

23. The method of claim 20 wherein step (i) employs low energy ball milling with a ball to powder weight ratio of from about 1:1 to 10:1.

24. The method of claim 20 wherein step (ii) employs high energy ball milling with a ball to powder weight ratio of from about 20:1 to 40:1.

* * * * *